(12) United States Patent
Hsiao (10) Patent No.: US 10,102,771 B2
(45) Date of Patent: Oct. 16, 2018

(54) METHOD AND DEVICE FOR LEARNING LANGUAGE AND COMPUTER READABLE RECORDING MEDIUM

(71) Applicant: Wistron Corporation, New Taipei (TW)

(72) Inventor: Hsi-chun Hsiao, New Taipei (TW)

(73) Assignee: Wistron Corporation, New Taipei (TW)

( * ) Notice: Subject to any disclaimer, the term of this patent is extended or adjusted under 35 U.S.C. 154(b) by 72 days.

(21) Appl. No.: 14/179,572

(22) Filed: Feb. 13, 2014

(65) Prior Publication Data
US 2014/0324433 A1   Oct. 30, 2014

(30) Foreign Application Priority Data

Apr. 26, 2013 (TW) .............................. 102115082 A (51) Int. Cl.
*G10L 15/00* (2013.01)
*G09B 19/06* (2006.01)

(52) U.S. Cl.
CPC ................................. *G09B 19/06* (2013.01)

(58) Field of Classification Search
CPC ....... G10L 15/02; G10L 15/08; G10L 15/063; G10L 15/187
USPC .................. 704/251–254; 715/203
See application file for complete search history.

(56) References Cited

U.S. PATENT DOCUMENTS

| 5,487,671 | A | * | 1/1996 | Shpiro | G09B 7/04 434/185 |
|---|---|---|---|---|---|
| 5,963,903 | A | * | 10/1999 | Hon | G10L 15/063 704/240 |
| 5,995,928 | A | * | 11/1999 | Nguyen et al. | 704/251 |
| 6,226,610 | B1 | * | 5/2001 | Keiller et al. | 704/241 |
| 6,535,853 | B1 | * | 3/2003 | Reitano | G10L 17/26 434/156 |
| 8,694,316 | B2 | | 4/2014 | Pickering et al. | |
| 8,744,856 | B1 | * | 6/2014 | Ravishankar | G09B 19/04 434/185 |
| 2002/0049590 | A1 | * | 4/2002 | Yoshino | G10L 15/075 704/241 |

(Continued)

FOREIGN PATENT DOCUMENTS

| CN | 1783213 | 6/2006 |
|---|---|---|
| TW | 325542 | 1/1998 |

(Continued)

OTHER PUBLICATIONS

"Office Action of Taiwan Counterpart Application" with partial English translation , dated Feb. 10, 2015, p. 1-p. 11.

(Continued)

*Primary Examiner* — Michael Colucci
(74) *Attorney, Agent, or Firm* — JCIPRNET (57) ABSTRACT

A method and a device for learning a language and a computer readable recording medium are provided. The method includes following steps. An input voice from a voice receiver is transformed into an input sentence according to a grammar rule. Whether the input sentence is the same as a learning sentence displayed on a display is determined. If the input sentence is different from the learning sentence, an ancillary information containing at least one error word in the input sentence that is different from the learning sentence is generated.

15 Claims, 8 Drawing Sheets

(56) References Cited

U.S. PATENT DOCUMENTS

| | | | | |
|---|---|---|---|---|
| 2003/0028378 A1* | 2/2003 | August | ................... | G09B 5/04 |
| | | | | 704/260 |
| 2003/0225580 A1 | 12/2003 | Lin | | |
| 2004/0006461 A1* | 1/2004 | Gupta | ................... | G06F 17/289 |
| | | | | 704/200 |
| 2004/0176960 A1* | 9/2004 | Shpiro | ................... | G09B 5/06 |
| | | | | 704/277 |
| 2005/0086705 A1* | 4/2005 | Jarman et al. | ................ | 725/136 |
| 2006/0004567 A1* | 1/2006 | Russell | ................... | G09B 5/06 |
| | | | | 704/209 |
| 2007/0271241 A1* | 11/2007 | Morris | ................... | G10L 15/26 |
| 2009/0305203 A1* | 12/2009 | Okumura | ................ | G09B 5/06 |
| | | | | 434/185 |
| 2014/0120502 A1* | 5/2014 | Prince | ................... | G09B 5/062 |
| | | | | 434/157 |
| 2014/0223272 A1* | 8/2014 | Arora | ...................... | G09B 5/06 |
| | | | | 715/203 |

FOREIGN PATENT DOCUMENTS

| | | |
|---|---|---|
| TW | 200421126 | 10/2004 |
| TW | 200506764 | 2/2005 |
| TW | I238379 | 8/2005 |

OTHER PUBLICATIONS

"Office Action of China Counterpart Application" with English translation thereof, dated Oct. 27, 2016, p. 1-p. 26.

"Office Action of China Counterpart Application," with partial English translation thereof, dated Jul. 10, 2017, p. 1-p. 23.

* cited by examiner

METHOD AND DEVICE FOR LEARNING LANGUAGE AND COMPUTER READABLE RECORDING MEDIUM

CROSS-REFERENCE TO RELATED APPLICATION

This application claims the priority benefit of Taiwan application serial no. 102115082, filed on Apr. 26, 2013. The entirety of the above-mentioned patent application is hereby incorporated by reference herein and made a part of this specification.

BACKGROUND OF THE DISCLOSURE

1. Field of the Disclosure

The present disclosure relates to a method and a device for learning a language and a computer readable recording medium.

2. Description of Related Art

Generally speaking, the developer of a conventional language learning software pre-records the pronunciations of different words and phrases and generates corresponding acoustic models according to these pre-recorded pronunciations. When a user learns to pronounce a word or phrase by using the language learning software, the system compares the received voice signal with the corresponding acoustic model to determine whether the user's pronunciation is correct or not.

Even though the conventional learning mechanism described above can determine whether the pronunciation of the user is correct or not and output the word or phrase that is not correctly pronounced, the user cannot get to know how exactly his/her pronunciation is through such a learning mechanism. For example, when the user keeps pronouncing the English word "play" as "pay", the conventional learning mechanism cannot instantly point out this issue but simply tells the user that his/her pronunciation is incorrect or provides information of the correct pronunciation.

SUMMARY OF THE DISCLOSURE

Accordingly, the present disclosure is directed to a method and a device for learning a language and a computer readable recording medium, in which the efficiency of a user in learning the pronunciation of a foreign language is effectively improved.

The present disclosure provides a language learning method. The language learning method includes following steps. An input voice from a voice receiver is transformed into an input sentence according to a grammar rule. Whether the input sentence is the same as a learning sentence displayed on a display is determined. If the input sentence is different from the learning sentence, an ancillary information containing at least one error word in the input sentence which is different from the learning sentence is generated.

According to an embodiment of the present disclosure, the step of transforming the input voice from the voice receiver into the input sentence according to the grammar rule further includes following steps. A first phoneme sequence corresponding to the input voice is obtained. The input sentence corresponding to the first phoneme sequence is obtained according to the grammar rule.

According to an embodiment of the present disclosure, the step of determining whether the input sentence is the same as the learning sentence displayed on the display further includes following steps. A second phoneme sequence corresponding to the input sentence is obtained. Whether the second phoneme sequence is the same as a standard phoneme sequence corresponding to the learning sentence is determined. If the second phoneme sequence is different from the standard phoneme sequence, the input sentence is determined to be different from the learning sentence.

According to an embodiment of the present disclosure, the step of determining whether the second phoneme sequence is the same as the standard phoneme sequence corresponding to the learning sentence further includes following steps. The second phoneme sequence is compared with the standard phoneme sequence by using a dynamic time warping (DTW) algorithm. Whether the second phoneme sequence is the same as the standard phoneme sequence is determined according to a comparison result of the DTW algorithm.

According to an embodiment of the present disclosure, the step of generating the ancillary information containing the at least one error word in the input sentence which is different from the learning sentence further includes following steps. An error information between the second phoneme sequence and the standard phoneme sequence is obtained according to the comparison result of the DTW algorithm. The at least one error word in the input sentence and at least one standard word corresponding to the at least one error word in the learning sentence are obtained according to the error information. The ancillary information containing the at least one error word and the at least one standard word is generated.

According to an embodiment of the present disclosure, the step of determining whether the input sentence is the same as the learning sentence displayed on the display further includes following steps. The input sentence is compared with the learning sentence by using a DTW algorithm. An identity information between the input sentence and the learning sentence is obtained according to a comparison result of the DTW algorithm. At least one correct word in the input sentence which is the same as the learning sentence is aligned with at least one standard word in the learning sentence which is corresponding to the at least one correct word according to the identity information. If the input sentence cannot be completely aligned with the learning sentence, the input sentence is determined to be different from the learning sentence.

According to an embodiment of the present disclosure, the step of generating the ancillary information containing the at least one error word in the input sentence which is different from the learning sentence further includes following steps. The input sentence is divided into at least one phrase according to a grammar format of the learning sentence. The ancillary information containing the at least one error word is generated in unit of the at least one phrase.

According to an embodiment of the present disclosure, the language learning method further includes following steps. The learning sentence is displayed through the display. The input voice is received through the voice receiver.

The present disclosure also provides a language learning device. The language learning device includes a first processor and a second processor. The first processor transforms an input voice into an input sentence according to a grammar rule. The second processor determines whether the input sentence is the same as a learning sentence. If the input sentence is different from the learning sentence, the second processor generates an ancillary information containing at least one error word in the input sentence which is different from the learning sentence.

The present disclosure further provides a computer readable recording medium. The computer readable recording medium stores a plurality of program codes. After the program codes are loaded into a processor, the processor executes the program codes to accomplish following steps. An input voice from a voice receiver is transformed into an input sentence according to a grammar rule. Whether the input sentence is the same as a learning sentence displayed on a display is determined. If the input sentence is different from the learning sentence, an ancillary information containing at least one error word in the input sentence which is different from the learning sentence is generated.

As described above, the present disclosure provides a method and a device for learning a language and a computer readable recording medium. An input voice of a user is transformed into an input sentence, and whether the input sentence is the same as a learning sentence displayed on a display is determined through phoneme comparison or sentence comparison. If the input sentence is different from the learning sentence, an ancillary information containing error words in the input sentence which are different from the learning sentence is generated. Thereby, the user can get to know the exact problem in his/her pronunciation and whether one word is confused with another by reading the ancillary information.

These and other exemplary embodiments, features, aspects, and advantages of the disclosure will be described and become more apparent from the detailed description of exemplary embodiments when read in conjunction with accompanying drawings.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Reference will now be made in detail to the present preferred embodiments of the disclosure, examples of which are illustrated in the accompanying drawings. Wherever possible, the same reference numbers are used in the drawings and the description to refer to the same or like parts.

In order to improve the efficiency of a user in learning a foreign language (for example, English, Japanese, or any other language), an embodiment of the present disclosure provides a language learning method. In the language learning method, a learning sentence to be practiced by a user is displayed on a display, and a voice given out by the user according to the learning sentence is received. Then, the voice given out by the user is transformed into a corresponding input sentence, and the input sentence is compared with the learning sentence which is used as the example of the pronunciation practice through phoneme comparison or sentence comparison. After that, a corresponding ancillary information is generated or a predetermined operation is executed.

Additionally, embodiments of the present disclosure further provide a language learning device and a computer readable recording medium for implementing foregoing language learning method. Below, exemplary embodiments of the present disclosure will be described with reference to accompanying drawings.

First Exemplary Embodiment

Figure 1:
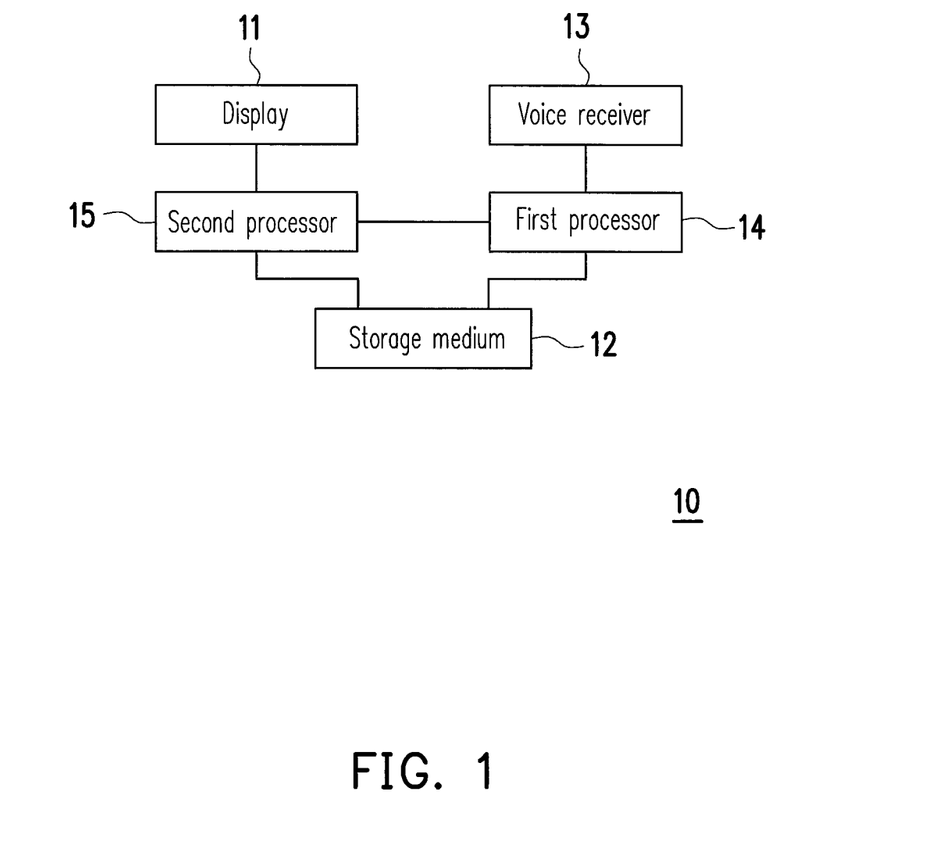
FIG. 1 is a functional block diagram of a language learning device according to a first exemplary embodiment of the present disclosure.

FIG. 1 is a functional block diagram of a language learning device according to the first exemplary embodiment of the present disclosure. Referring to FIG. 1, the language learning device 10 is an electronic device offering different operational functions, such as a personal digital assistant (PDA), a smart phone, a notebook computer, a tablet PC, or a desktop computer.

The language learning device 10 includes a display 11, a storage medium 12, a voice receiver 13, a first processor 14, and a second processor 15.

The display 11 may be a liquid crystal display (LCD), a light-emitting diode (LED) display, a field emission display (FED), or any other type of display. Or, the display 11 may also be a display offering a touch control function. However, the type of the display 11 is not limited in the present disclosure.

The storage medium 12 may be one or a combination of different non-volatile memories, such as a read-only memory (ROM) and/or a flash memory. Besides, the storage medium 12 may also be one or a combination of a hard disc, a CD-ROM, or an external storage device (for example, a memory card or a flash drive). However, the implementation of the storage medium 12 is not limited herein.

In the present exemplary embodiment, the storage medium 12 stores an acoustic database and a grammar database. The acoustic database stores a plurality of acoustic models and phonemes corresponding to these acoustic models. Herein each acoustic model is corresponding to one or a combination of multiple phonemes. It should be mentioned that a phoneme is the smallest pronunciation unit, such as a phonetic symbol in KK phonetics or phonics, and which can be determined according to the actual requirement. The grammar database stores information such as phrases, words, grammar rules commonly used by these phrases and words, and/or phrase structures.

In the present exemplary embodiment, the grammar database of the storage medium 12 is established through a method of rules or a method of statistics. Taking the method of rules as an example, all or those commonly used grammar rules in a language (for example, English) are stored in the grammar database to establish the grammar database. Or, taking the method of statistics as an example, a statistical grammar database can be established through probabilistic context-free grammars (PCFG). In particularly, the PCFG technique offers a self-learning mechanism therefore is more convenient to use. Additionally, in an embodiment, the acoustic database can be replaced by an existing acoustic data (for example, the Google acoustic database) on the Internet, and the grammar database can be replaced by an online grammar database, which should be determined according to the actual requirement.

The voice receiver 13 may be a microphone or any voice receiving device offering a voice receiving function. The first processor 14 and the second processor 15 may be two independent logic circuits or central processing units (CPUs). Or, the first processor 14 and the second processor 15 may also be implemented as a single CPU, chipset, or logic circuit. However, how the first processor 14 and the second processor 15 are implemented is not limited in the present disclosure.

Figure 2:
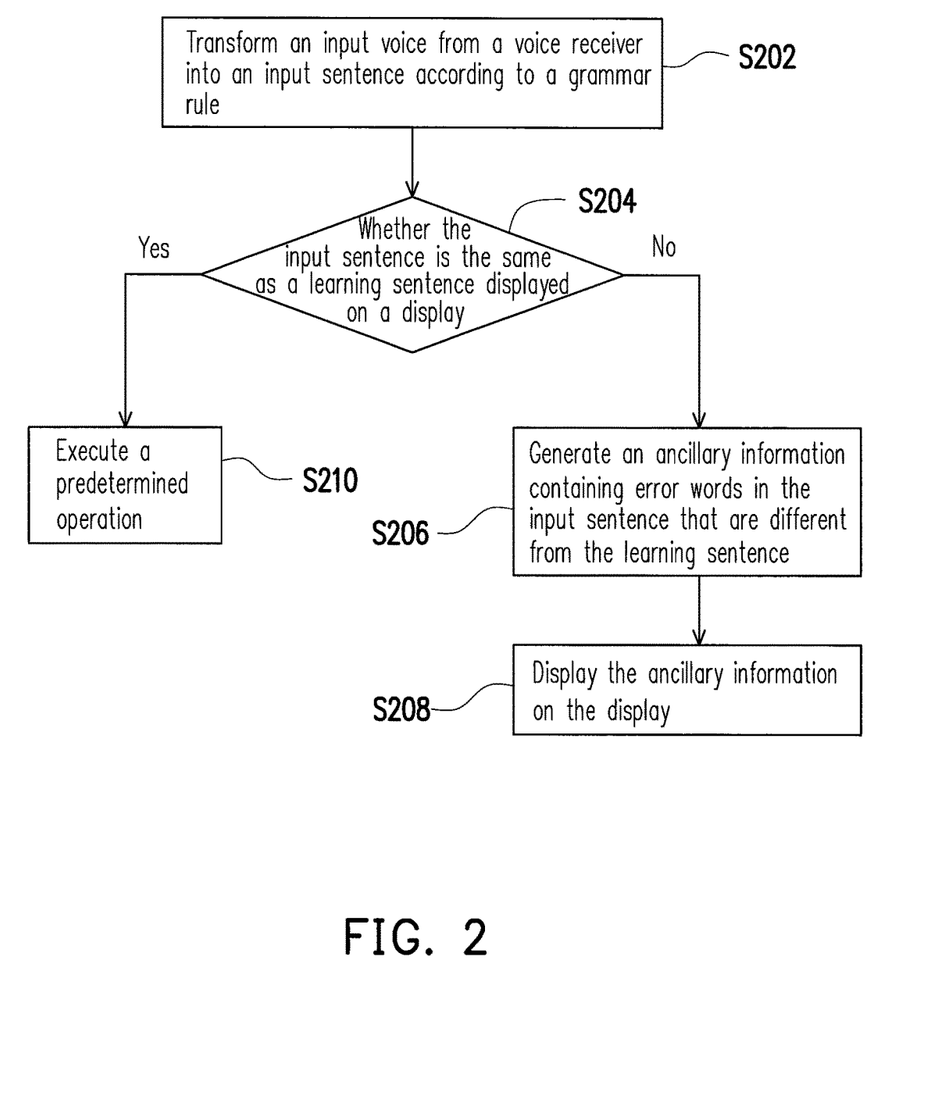
FIG. 2 is a flowchart of a language learning method according to the first exemplary embodiment of the present disclosure.

FIG. 2 is a flowchart of a language learning method according to the first exemplary embodiment of the present disclosure. Below, the language learning method in the present exemplary embodiment and the implementation of the language learning device 10 will be described in detail with reference to FIG. 1 and FIG. 2.

Referring to FIG. 1 and FIG. 2, when a user learns a language, the user can see a sentence (referred to as a learning sentence thereinafter) displayed on the display 11. In step S202, the first processor 14 transforms an input voice signal (referred to as an input voice thereinafter) from the voice receiver 13 into an input sentence according to a predetermined grammar rule.

For example, when the first processor 14 receives the input voice from the voice receiver 13, the first processor 14 first obtains a phoneme sequence (referred to as a first phoneme sequence thereinafter) corresponding to the input voice. For example, the first processor 14 compares the input voice with one or more acoustic models in the acoustic database of the storage medium 12 to obtain one or more acoustic models which match the input voice the most. Then, the first processor 14 obtains the first phoneme sequence from the acoustic database according to the one or more acoustic models. In the present exemplary embodiment, the first phoneme sequence contains one or more phonemes.

Next, the first processor 14 searches the grammar database of the storage medium 12 to obtain the input sentence corresponding to the first phoneme sequence according to a grammar rule stored in the grammar database. Particularly, in the present exemplary embodiment, during the process of obtaining the input sentence, the input sentence is actually obtained by performing phoneme analysis, grammar analysis, and/or optimization on the input voice. Thus, the input sentence is already roughly compliant with a grammar rule or phrase structure commonly used in the language. Assuming that English is the language to be learned by the user and KK phonetics is the phoneme format, when the first processor 14 identifies the first phoneme sequence as "kudtu" according to the input voice, the first processor 14 generates an input sentence like "could to" by searching the grammar database. Herein the first phoneme sequence (i.e., "kudtu") is the result of phoneme analysis, and the input sentence (i.e., "could to") is the result of grammar analysis and optimization.

In next step S204, the second processor 15 determines whether the input sentence generated by the first processor 14 is the same as the learning sentence. The learning sentence mentioned herein is stored in a learning sentence database of the storage medium 12, and when the user is about to perform pronunciation practice, the second processor 15 obtains the learning sentence from the storage medium 12 and displays the learning sentence to the user through the display 11. In the present exemplary embodiment, the second processor 15 directly compares the input sentence with the learning sentence to determine whether the input sentence is the same as the learning sentence.

If the second processor 15 determines that the input sentence is different from the learning sentence, in step S206, the second processor 15 generates an ancillary information containing one or more error words in the input sentence which are different from the learning sentence.

Figure 3:
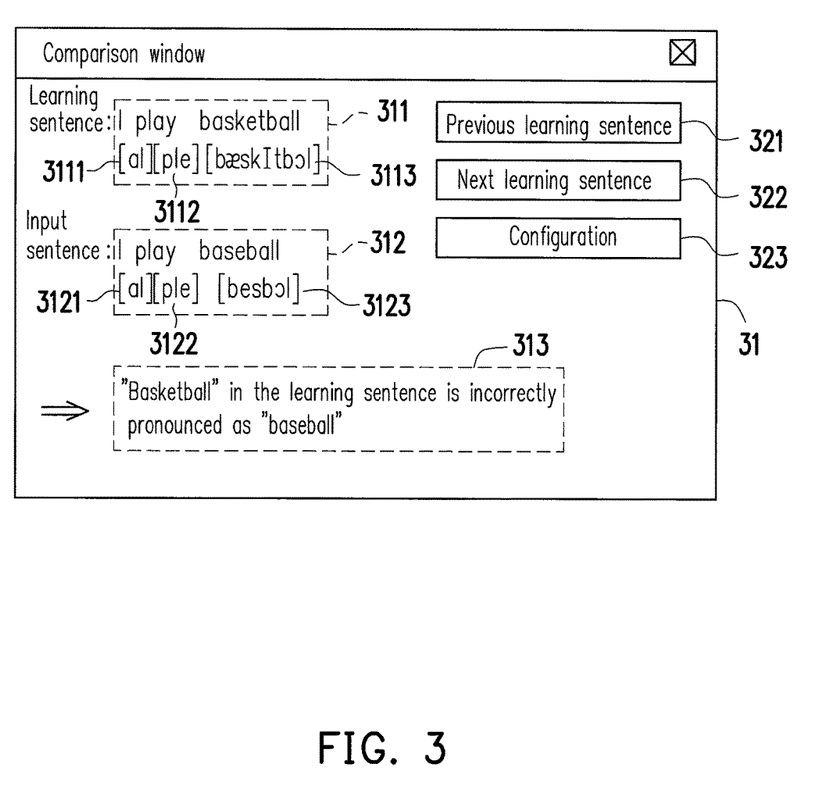
FIG. 3 is a diagram of an ancillary information according to the first exemplary embodiment of the present disclosure.

FIG. 3 is a diagram of an ancillary information according to the first exemplary embodiment of the present disclosure. Referring to FIG. 3, in the comparison window 31 displayed on a display (for example, the display 11), a word in the learning sentence 311 is "basketball", but the corresponding word in the input sentence 312 generated by the first processor 14 according to the user's voice is "baseball". In this case, the second processor 15 determines that the input sentence 312 is different from the learning sentence 311 and generates an ancillary information 313 containing the error word (i.e., "baseball"). Taking FIG. 3 as an example, the ancillary information 313 may be "You pronounced 'basketball' in the learning sentence as 'baseball'". Accordingly, the user can get to know that he/she incorrectly pronounced "basketball" as "baseball" according to the ancillary information 313 and practice one more time regarding the incorrect pronunciation according to the ancillary information 313.

On the other hand, if the second processor 15 determines that the input sentence 312 is the same as the learning sentence 311, in step S210, the second processor 15 executes a predetermined operation (for example, displays another learning sentence on the display 11).

In other words, in the present disclosure, besides informing the user that his/her pronunciation is incorrect and about the incorrect pronunciations, the user can be further informed that he/she incorrectly pronounces a specific word or phrase as another word or phrase (for example, "basketball" as "baseball"). Thereby, not only the user can get to know blind spots in his/her pronunciations, but comparison information of correct words and those words incorrectly pronounced by the user (for example, words with similar pronunciations, such as "basketball" and "baseball") can be provided to the user, so that the efficiency of the user in learning the foreign language is effectively improved.

It should be noted herein that the comparison window (for example, the comparison window 31) and/or the ancillary information (for example, the ancillary information 313) mentioned in the present exemplary embodiment may further include different learning-assisting information. Taking FIG. 3 as an example, the comparison window 31 includes phoneme groups 3111-3113 (i.e., "aɪ", "ple", and "bæskɪ tbɔ l") for instructing the pronunciation of the learning sentence 311 and phoneme groups 3121-3123 (i.e., "aɔ", "ple", and "besbɔ l") for instructing the pronunciation of the input sentence 312. Or, as shown in FIG. 3, the comparison window 31 also includes function buttons 321-323. However, the present disclosure is not limited thereto. For example, when the user presses the function button 321, the previous learning sentence is practiced again, when the user presses the function button 322, the next learning sentence is practiced, and when the user presses the function button 323, a setting/configuration menu is entered to execute a setting/configuration operation.

However, the implementations described above are not intended to limit the scope of the present disclosure. In an exemplary embodiment, the second processor determines whether the user's pronunciation is correct or not by comparing the first phoneme sequence with a standard phoneme sequence of the learning sentence and displays the corresponding ancillary information to help the user to correct his/her pronunciation.

Second Exemplary Embodiment

Figure 4:
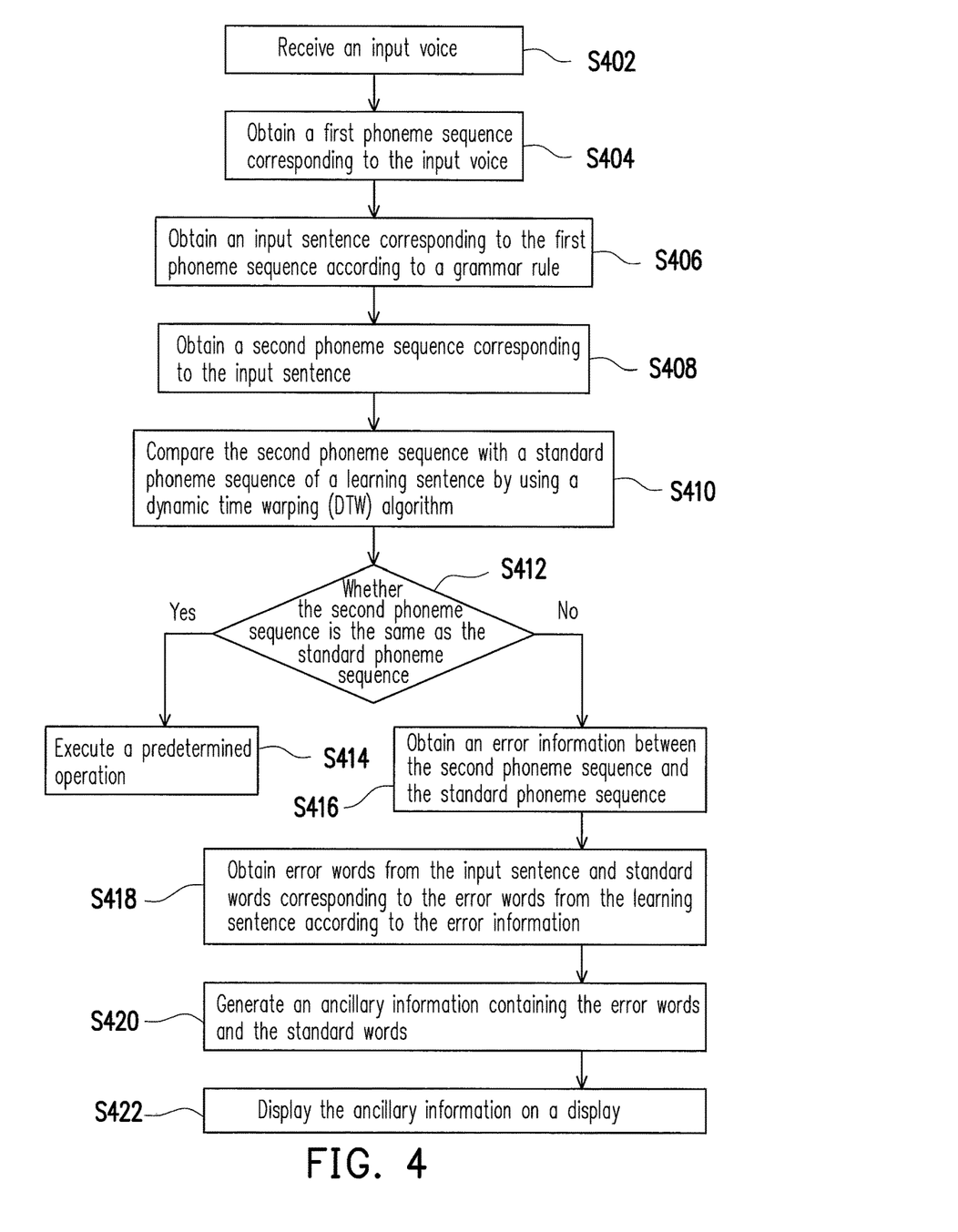
FIG. 4 is a flowchart of a language learning method according to a second exemplary embodiment of the present disclosure.

FIG. 4 is a flowchart of a language learning method according to the second exemplary embodiment of the present disclosure. The hardware structure in the second exemplary embodiment is similar to that in the first exemplary embodiment therefore will not be described herein. Below, the second exemplary embodiment will be described by using the elements in the first exemplary embodiment.

Referring to FIG. 1 and FIG. 4, when a user learns a language, the user can see a learning sentence (for example, the learning sentence 311 in FIG. 3) displayed on the display 11. In step S402, the voice receiver 13 receives an input voice from the user. Then, in step S404, the first processor 14 obtains a first phoneme sequence corresponding to the input voice. Next, in step S406, the first processor 14 obtains an input sentence (for example, the input sentence 312 in FIG. 3) corresponding to the first phoneme sequence according to a grammar rule stored in the storage medium 12. The implementations of steps S402, S404, and S406 can be referred to descriptions related to step S202 in the first exemplary embodiment therefore will not be described herein.

In next step S408, the second processor 15 obtains a phoneme sequence (referred to as a second phoneme sequence thereinafter) corresponding to the input sentence generated in step S406. Taking FIG. 3 as an example, the second processor 15 obtains the phoneme groups 3121-3123 (i.e., "aɪ", "ple", and "besbɔ l") corresponding to the words and phrases in the input sentence 312 from the storage medium 12 and combines the phoneme groups 3111-3113 to generate the second phoneme sequence (for example, "aɪ plebesbɔ l").

After that, in step S410, the second processor 15 obtains a standard phoneme sequence corresponding to the learning sentence from the storage medium 12. Taking FIG. 3 as an example, the second processor 15 combines the phoneme groups 3111-3113 of the learning sentence 311 into the standard phoneme sequence (i.e., "aɪ plebæskɪ tbɔ l") and compares the second phoneme sequence (for example, "aɪ plebesbɔ l") with the standard phoneme sequence (for example, "aɪ plebæskɪ tbɔ l") by using a dynamic time warping (DTW) algorithm.

Particularly, in most languages, when multiple words or phrases are combined into a sentence, the pronunciations of some words or phrases in the sentence may change. For example, these pronunciation changes include connected sound, mute sound, thin sound, and/or varied sound. If the user is not aware of these pronunciation changes but simply practices a learning sentence based on the pronunciation of every single word or phrase, the user's oral skills cannot be further improved.

Thus, in step S410, the second processor 15 adaptively obtains a standard phoneme sequence compliant with the overall grammatical structure of the learning sentence from the storage medium 12 according to different positions of words and/or phrases in the learning sentence.

Next, in step S412, the second processor 15 determines whether the second phoneme sequence is the same as the standard phoneme sequence according to the comparison result of the DTW algorithm. If the second processor 15 determines that the second phoneme sequence is the same as the standard phoneme sequence, in step S414, the second processor 15 executes a predetermined operation (for example, displays another learning sentence on the display 11).

Figure 5:
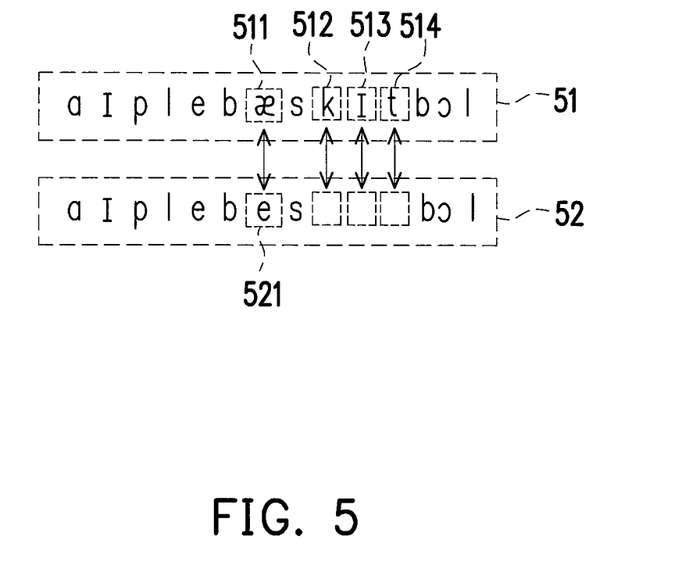
FIG. 5 is a diagram illustrating the comparison between a second phoneme sequence and a standard phoneme sequence according to the second exemplary embodiment of the present disclosure.

FIG. 5 is a diagram illustrating the comparison between a second phoneme sequence and a standard phoneme sequence according to the second exemplary embodiment of the present disclosure. Referring to FIG. 5, it is assumed that the standard phoneme sequence 51 is "aɪ plebæskɪ tbɔ l", and the second phoneme sequence 52 is "aɪ plebesbɪ l". After the second processor 15 compares the standard phoneme sequence 51 (i.e., "aɪ plebæskɪ tbɔ l") with the second phoneme sequence 52 (i.e., "aɪ plebesbɔ l") by using the DTW algorithm, the second processor 15 determines that the standard phoneme sequence 51 is different from the second phoneme sequence 52, and the phonemes causing the difference in the standard phoneme sequence 51 and the second phoneme sequence 52 are the phonemes 511-514 in the standard phoneme sequence 51 and the phoneme 521 in the second phoneme sequence 52.

In other words, according to the comparison result of the DTW algorithm, the second processor 15 determines that the user incorrectly pronounces the phoneme 511 (i.e., "æ") in the standard phoneme sequence 51 as the phoneme 521 (i.e., "e") in the second phoneme sequence 52 and misses out the phonemes 512-514 (i.e., "k", "ɪ", and "t") in the standard phoneme sequence 51.

As described above, the standard phoneme sequence 51 is different from the second phoneme sequence 52, and the learning sentence corresponding to the standard phoneme sequence 51 is different from the input sentence corresponding to the second phoneme sequence 52. Thus, whether the learning sentence is the same as the input sentence (as in step S204 of the first exemplary embodiment) can also be determined in the present exemplary embodiment by comparing the standard phoneme sequence 51 and the second phoneme sequence 52.

Referring to FIG. 4 again, if the second processor 15 determines that the second phoneme sequence is different from the standard phoneme sequence, in step S416, the second processor 15 obtains an error information between the second phoneme sequence and the standard phoneme sequence according to the comparison result of the DTW algorithm. Taking FIG. 5 as an example, the error information obtained by the second processor 15 includes that the user incorrectly pronounces the phoneme 511 (i.e., "æ") in the standard phoneme sequence 51 as the phoneme 521 (i.e., "e") in the second phoneme sequence 52 and misses out the phonemes 512-514 (i.e., "k", "ɪ", and "t") in the standard phoneme sequence 51.

Next, in step S418, the second processor 15 obtains one or more error words from the input sentence and one or more standard words corresponding to the error words from the learning sentence according to the error information. Taking FIG. 5 as an example, the second processor 15 obtains the standard word "basketball" from the learning sentence corresponding to the standard phoneme sequence 51 according to the phonemes 511-514 and obtains the error word "baseball" from the input sentence corresponding to the second phoneme sequence 52 according to the phoneme 521 and the positions of the missing phonemes 512-514.

Thereafter, in step S420, the second processor 15 generates an ancillary information containing the error words and the standard words. Taking FIG. 3 as an example, the second processor 15 generates the ancillary information 313 or another similar ancillary information, which will not be described herein. After that, in step S422, the second processor 15 displays the ancillary information on the display 11.

However, the implementation described above is not intended to limit the scope of the present disclosure. In an exemplary embodiment, the second processor may determine whether the user's pronunciation is correct or not by aligning the same words in the input sentence and the learning sentence and present the comparison result through a phrase structure. Thereby, both a grammar teaching function and a function of practicing pronunciation in unit of phrases are achieved.

Third Exemplary Embodiment

Figure 6:
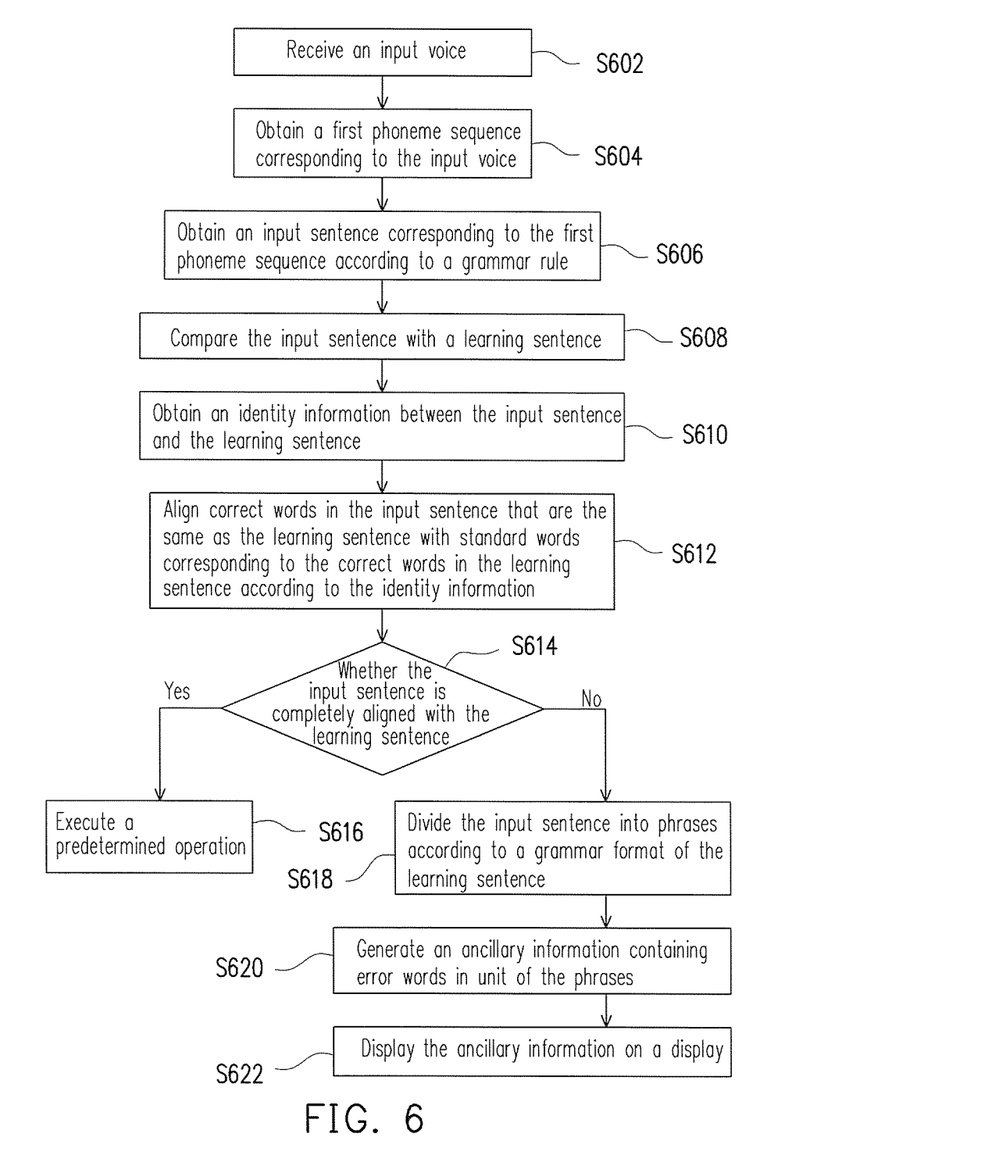
FIG. 6 is a flowchart of a language learning method according to a third exemplary embodiment of the present disclosure.

FIG. 6 is a flowchart of a language learning method according to the third exemplary embodiment of the present disclosure. The hardware structure in the third exemplary embodiment is similar to that in the first exemplary embodiment therefore will not be described herein. Below, the third exemplary embodiment will be described by using the elements in the first exemplary embodiment.

Referring to FIG. 1 and FIG. 6, when a user learns a language, the user can see a learning sentence (for example, the learning sentence 311 in FIG. 3) displayed on the display 11. In step S602, the voice receiver 13 receives an input voice from the user. Then, in step S604, the first processor 14 obtains a first phoneme sequence corresponding to the input voice. Next, in step S606, the first processor 14 obtains an input sentence (for example, the input sentence 312 in FIG. 3) corresponding to the first phoneme sequence according to a grammar rule stored in the storage medium 12. The implementations of steps S602, S604, and S606 can be referred to descriptions related to step S202 in the first exemplary embodiment therefore will not be described herein.

In next step S608, the second processor 15 compares the input sentence with the learning sentence. For example, the second processor 15 compares the input sentence with the learning sentence by using aforementioned DTW algorithm.

Figure 7A:
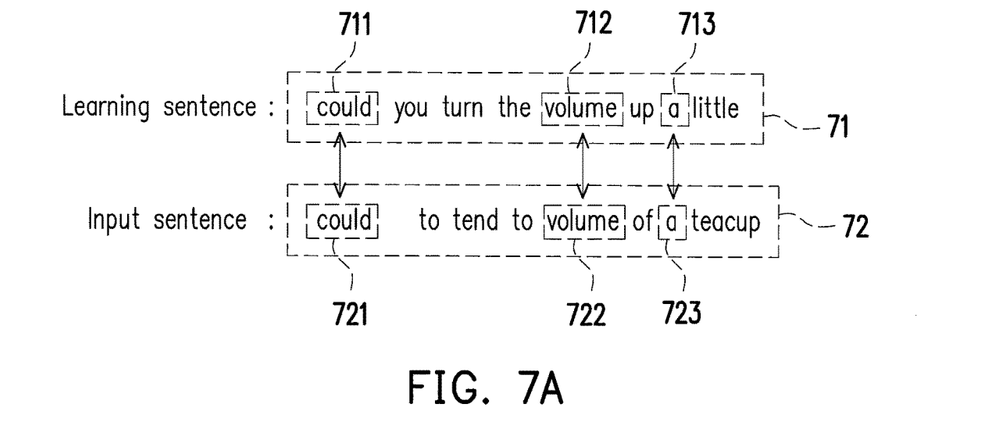
FIG. 7A is a diagram illustrating the comparison between an input sentence and a learning sentence according to the third exemplary embodiment of the present disclosure.

FIG. 7A is a diagram illustrating the comparison between an input sentence and a learning sentence according to the third exemplary embodiment of the present disclosure. Referring to FIG. 7A, it is assumed that the learning sentence 71 is "Could you turn the volume up a little", and the input sentence 72 is "Could to tend to volume of a teacup". After the second processor 15 compares the learning sentence 71 (i.e., "Could you turn the volume up a little") with the input sentence 72 (i.e., "Could to tend to volume of a teacup") by using the DTW algorithm, the second processor 15 determines that the correct words 721-723 in the input sentence 72 and the standard words 711-713 in the learning sentence 71 are sequentially "Could", "volume", and "a".

Referring to FIG. 6 again, in step S610 after step S608, the second processor 15 obtains an identity information between the input sentence and the learning sentence according to the comparison result of the DTW algorithm. Taking FIG. 7A as an example, the identity information contains the correct words 721-723 in the input sentence 72, the standard words 711-713 in the learning sentence 71, and the correspondences between the correct words 721-723 and the standard words 711-713.

Next, in step S612, the second processor 15 aligns one or more correct words in the input sentence which are the same as the learning sentence with one or more standard words corresponding to the one or more correct words in the learning sentence according to the identity information. Taking FIG. 7A as an example, the second processor 15 sequentially aligns the correct words 721-723 in the input sentence 72 with the standard words 711-713 in the learning sentence 71.

Thereafter, in step S614, the second processor 15 determines whether the input sentence can be completely aligned with the learning sentence. If the second processor 15 determines that the input sentence can be completely aligned with the learning sentence, it determines that the input sentence is the same as the learning sentence. Accordingly, in step S616 after step S614, the second processor 15 executes a predetermined operation (for example, displays another learning sentence on the display 11).

On the other hand, if the second processor 15 determines that the input sentence cannot be completely aligned with the learning sentence (for example, in the input sentence 72 in FIG. 7A, only the correct words 721-723 can be aligned with the standard words 711-713 in the learning sentence 71), the second processor 15 executes step S618 after step S614.

In step S618, the second processor 15 divides the input sentence into one or more phrases according to a grammar format of the learning sentence. For example, the second processor 15 searches the grammar database in the storage medium 12 to obtain the grammar format compliant with a predetermined grammar rule in the learning sentence.

Figure 7B:
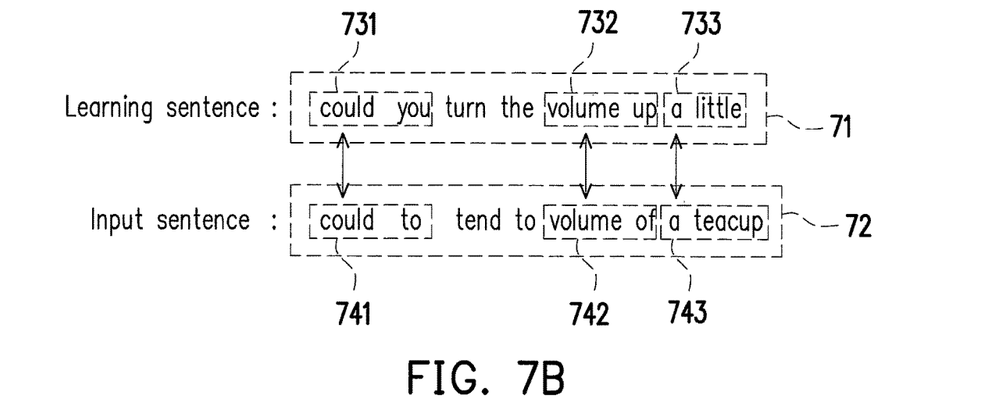
FIG. 7B is a diagram illustrating how an input sentence is divided into phrases according to the third exemplary embodiment of the present disclosure.

FIG. 7B is a diagram illustrating how an input sentence is divided into phrases according to the third exemplary embodiment of the present disclosure. Referring to FIG. 7B, by searching the grammar database, the second processor 15 gets to know that the learning sentence 71 contains phrase structures 731-733, and the phrase structures 731-733 are respectively "could you", "volume up", and "a little". Thus, in the present exemplary embodiment, the second processor 15 divides the input sentence 72 into phrases 741-743 according to the grammar format of the learning sentence 71, and the phrases 741-743 are respectively "could to", "volume of", and "a teacup".

Referring to FIG. 6 again, in step S620 after step S618, the second processor 15 generates the ancillary information containing one or more error words in unit of the phrases. In next step S622, the second processor 15 displays the ancillary information on the display 11.

Following table 1 shows ancillary information according to the third exemplary embodiment of the present disclosure. Referring to FIG. 7B and table 1, assuming that the ancillary information is generated in unit of the phrases 741-743, first, the user incorrectly pronounces "could you" in the learning sentence 71 as "could to" in the input sentence 72. Thus, the ancillary information notifies the user that the pronunciation of "j" (i.e., "j" in [kʊ d ju]) should be emphasized. In addition, the user incorrectly pronounces "volume up" in the learning sentence 71 as "volume of" in the input sentence 72. Thus, the ancillary information notifies the user that the pronunciation of "ʌ p" (i.e., "ʌ p" in [v ɑ ljə m ʌ p])

should be emphasized. Moreover, the user incorrectly pronounces "a little" in the learning sentence 71 as "a teacup" in the input sentence 72. Thus, the ancillary information notifies the user that the pronunciations of "lɪ" and "tl" (i.e., "lɪ" and "tl" in [e lɪ tl]) should be emphasized.

TABLE 1

| Phrase Of Learning Sentence | Phrase Of Input Sentence | Suggestion For Improvement |
|---|---|---|
| could you [kʊ d ju] | could to [kʊ d tu] | Emphasize the pronunciation of j |
| volume up [vɑ ljə mʌ p] | volume of [vɑ ljə m ɑ v] | Emphasize the pronunciation of $_A$ p |
| a little [e lɪ tl] | a teacup [e tik$_A$ p] | Emphasize the pronunciations of l$_I$ and tl |

Referring to FIG. 6 again, in step S618, the second processor 15 further divides those words and phrases in the learning sentence and the input sentence that are not in the phrase structure into a plurality of phrases not belonging to the phrase structure. After that, in step S620, the second processor 15 combines a plurality of phrases and generates the ancillary information containing error words in unit of these combined phrases.

Figure 7C:
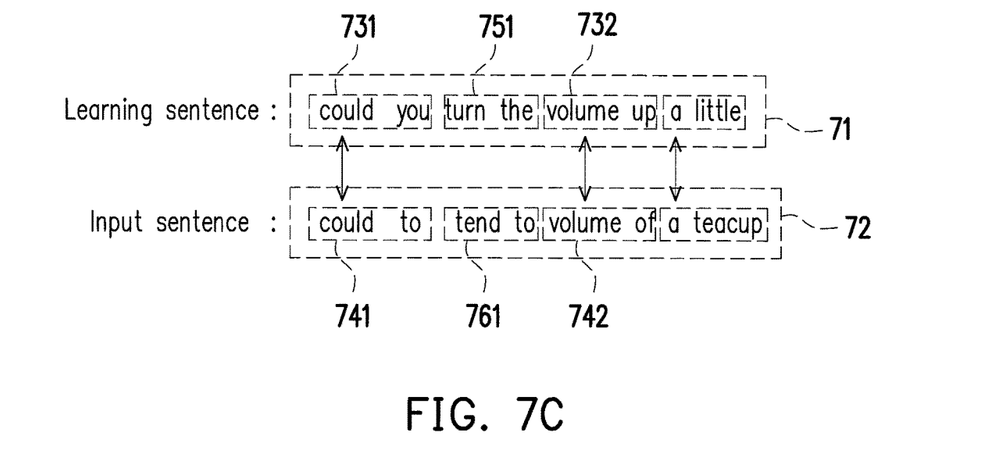
FIG. 7C is a diagram illustrating how phrases not belonging to a phrase structure are divided according to the third exemplary embodiment of the present disclosure.

FIG. 7C is a diagram illustrating how phrases not belonging to the phrase structure are grouped according to the third exemplary embodiment of the present disclosure. Referring to FIG. 7C, the second processor 15 uses the phrases 731 and 732 as boundaries and groups the words between the phrases 731 and 732 into a phrase 751 (i.e., a phrase not belonging to the phrase structure). Or, the second processor 15 obtains the phrase 751 by searching the grammar database of the storage medium 12.

Thereafter, the second processor 15 uses the phrases 741 and 742 as boundaries and groups the words between the phrases 741 and 742 into a phrase 761 (i.e., a phrase not belonging to the phrase structure). Accordingly, even though the input sentence 72 is a combination of random words, the second processor 15 systematically sorts the input sentence so that the input sentence can be further analyzed or used.

Following table 2 shows another ancillary information according to the third exemplary embodiment of the present disclosure. Referring to FIG. 7C and table 2, the second processor 15 displays an ancillary information with combined phrases 751 and 732 and combined phrases 761 and 742. Accordingly, according to the ancillary information, the user can practice the pronunciation of "turn the volume up" repeatedly so that it won't heard like "tend to volume of" to a native speaker.

TABLE 2

| Phrase In Learning Sentence | Phrase In Input Sentence | Suggestion For Improvement |
|---|---|---|
| turn the volume up [tʒ· nðə vɑ ljə mʌ p] | tend to volume of [tɛ nd tu vɑ ljə ɑ v] | After practicing each individual phrase, practice the pronunciation of this phrasal verb |

However, the implementation described above is not intended to limit the scope of the present disclosure. In an exemplary embodiment, the second processor further determines whether to divide the input sentence into a plurality of phrases. If the input sentence cannot or needs not to be divided into a plurality of phrases, subsequent operations are executed based on the implementation of the second exemplary embodiment. Contrarily, if the input sentence can be divided into a plurality of phrases, subsequent operations are executed based on the implementation of the third exemplary embodiment. Thereby, the flexibility of the present disclosure is effectively improved.

Fourth Exemplary Embodiment

Figure 8:
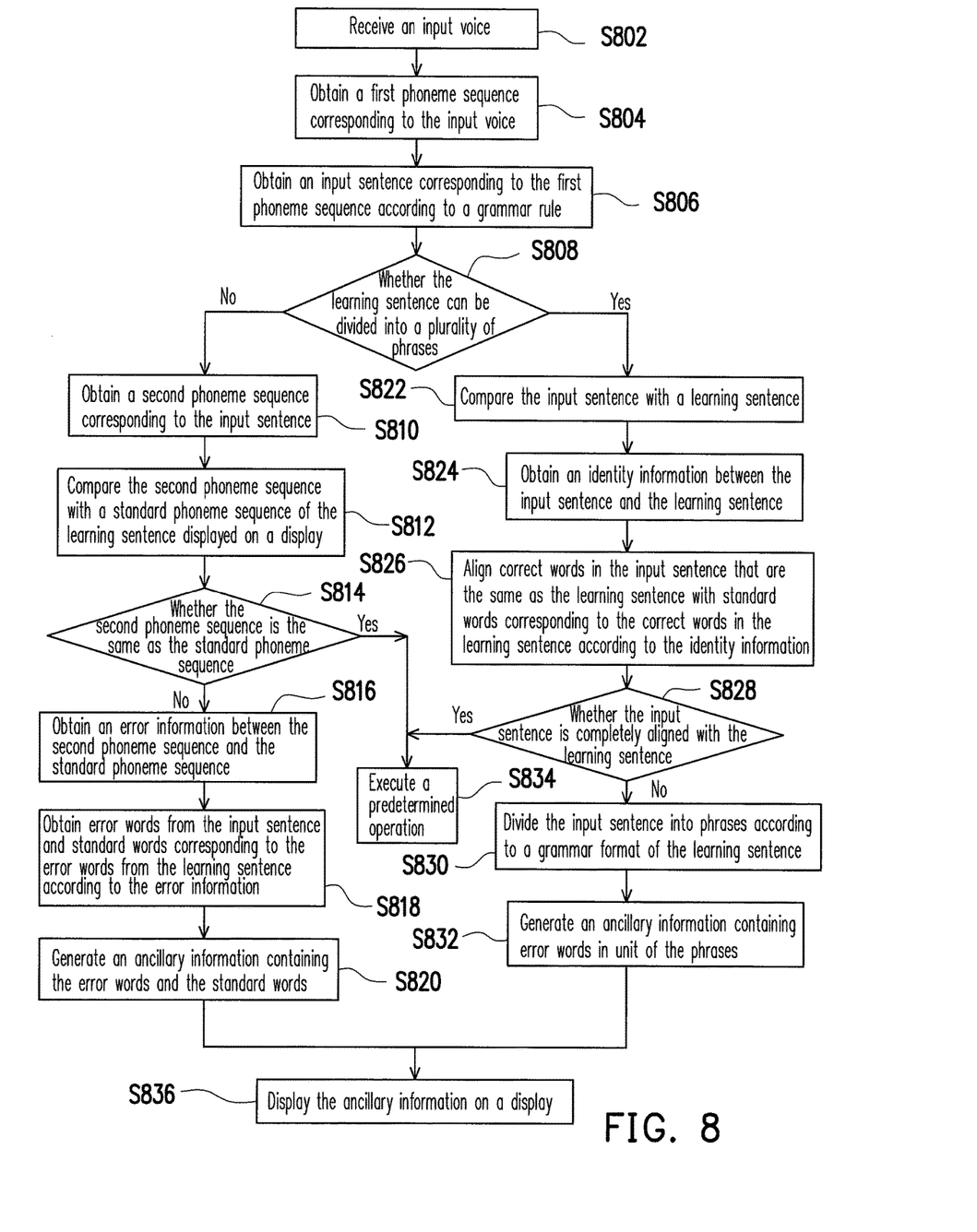
FIG. 8 is a flowchart of a language learning method according to a fourth exemplary embodiment of the present disclosure.

FIG. 8 is a flowchart of a language learning method according to the fourth exemplary embodiment of the present disclosure. The hardware structure in the fourth exemplary embodiment is similar to that in the first exemplary embodiment therefore will not be described herein. Below, the fourth exemplary embodiment will be described by using the elements in the first exemplary embodiment.

Referring to FIG. 1 and FIG. 8, when a user learns a language, the user can see a learning sentence (for example, the learning sentence 311 in FIG. 3) displayed on the display 11. In step S802, the voice receiver 13 receives an input voice from the user. Then, in step S804, the first processor 14 obtains a first phoneme sequence corresponding to the input voice. Then, in step S806, the first processor 14 obtains an input sentence (for example, the input sentence 312 in FIG. 3) corresponding to the first phoneme sequence according to a grammar rule stored in the storage medium 12. The implementations of steps S802, S804, and S806 can be referred to descriptions related to step S202 in the first exemplary embodiment therefore will not be described herein.

It should be mentioned that in step S808, the second processor 15 determines whether the learning sentence can be divided into a plurality of phrases, so as to determine whether the input sentence can be divided into a plurality of phrases. For example, the second processor 15 searches the grammar database of the storage medium 12 to obtain the grammar format of the learning sentence. After that, the second processor 15 determines whether the learning sentence includes one or more phrase structures according to the grammar format of the learning sentence. If the second processor 15 determines that the learning sentence does not include any phrase structure, the second processor 15 determines that the learning sentence cannot be divided into any phrase, and executes step S810 after step S808. On the other hand, if the second processor 15 determines that the learning sentence includes one or more phrase structures, the second processor 15 determines that the learning sentence can be divided into a plurality of phrases and executes step S822 after step S808.

Or, in step S808, the second processor 15 executes step S810 or S822 according to a selection of the user. The implementation of steps S810-S836 has been described in detail in foregoing exemplary embodiments therefore will not be described herein. For example, steps S810-S820 can be implemented by referring to the implementation of steps S408-S420, and steps S822-S832 can be implemented by referring to the implementation of steps S608-S620.

On the other hand, various steps of the language learning method described in foregoing exemplary embodiments can be implemented in a software or firmware form. For example, another exemplary embodiment of the present disclosure provides a computer readable recording medium based on the concept described in each of foregoing exemplary embodiments. The computer readable recording medium can be any data storage device for storing data, and which stores a plurality of program codes. After these program codes are loaded into a processor, the processor executes these program codes to accomplish various steps of the language learning method and related operations described in foregoing exemplary embodiments. The computer readable recording medium may be a read-only memory (ROM), a flash memory, a CD-ROM, a magnetic tape, a floppy disc, or an optical data storage device. The computer readable recording medium may also be distributed on a computer network system so that aforementioned program codes are stored and executed in a distributed manner. Moreover, aforementioned microprocessor unit may be an embedded processor or a CPU. However, the present disclosure is not limited thereto.

As described above, unlike the conventional technique in which a pronunciation of each word or phrase is pre-recorded, in the present disclosure, the pronunciation of a word or phrase is adaptively adjusted according to the position of the word or phrase in an input sentence, so that a user can learn to pronounce the word or phrase as a native speaker. Every time after the user finishes a pronunciation practice, the user can get to know the points to be improved in his/her pronunciation or carry on with the next pronunciation practice according to an ancillary information. Additionally, in the present disclosure, by systematically corresponding the grammar structure of an input sentence with the grammar structure of a learning sentence, a user can be notified from the viewpoint of phrase structure or grammatical structure about how to correct his/her pronunciation when the user reads an entire sentence or a part of a sentence. Thereby, the efficiency of learning a foreign language is effective improved.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A language learning method, comprising:
    transforming a first input voice from a voice receiver into an input sentence according to a grammar rule;
    determining whether the input sentence is the same as a learning sentence displayed on a display; and
    when the input sentence is different from the learning sentence, generating an ancillary information comprising at least one error word in the input sentence that is different from the learning sentence,
    wherein the step of transforming the first input voice from the voice receiver into the input sentence according to the grammar rule comprises:
        obtaining, based on the first input voice, a first phoneme sequence, wherein the first phoneme sequence represents a pronunciation of the entire first input voice; and
        obtaining, based on the entire first phoneme sequence, the input sentence according to the grammar rule,
    wherein the step of determining whether the input sentence is the same as the learning sentence displayed on the display comprises:
        obtaining, based on the input sentence, a second phoneme sequence, wherein the second phoneme sequence represents a pronunciation of the entire input sentence;
        determining whether the second phoneme sequence is the same as a standard phoneme sequence corresponding to the learning sentence; and
        determining whether the input sentence is different from the learning sentence when the second phoneme sequence is different from the standard phoneme sequence,
    wherein the step of generating the ancillary information comprising the at least one error word in the input sentence that is different from the learning sentence comprises:
        dividing the input sentence into at least one phrase according to a grammar format of the learning sentence; and
        generating the ancillary information in unit of the at least one phrase, wherein the ancillary information comprises the at least one error word and at least one phoneme of a standard phoneme sequence corresponding to the learning sentence, wherein the at least one phoneme is pronounced incorrectly and corresponded to the at least one error word,
    wherein the learning sentence comprises a plurality of words, and the standard phoneme sequence compliant with a grammatical structure of the learning sentence is determined according to positions of the plurality of words in the learning sentence,
    wherein the ancillary information further comprises a suggestion indicating to practice a pronunciation of at least two adjacent words of a specific phrase which conforms to a specific phrase structure recorded in a grammar database, wherein the at least two adjacent words comprises one of the at least one error word.

2. The language learning method according to claim 1, wherein the step of determining whether the second phoneme sequence is the same as the standard phoneme sequence corresponding to the learning sentence comprises:
    comparing the second phoneme sequence with the standard phoneme sequence by using a dynamic time warping (DTW) algorithm; and
    determining whether the second phoneme sequence is the same as the standard phoneme sequence according to a comparison result of the DTW algorithm.

3. The language learning method according to claim 2, wherein the step of generating the ancillary information comprising the at least one error word in the input sentence that is different from the learning sentence comprises:
    obtaining an error information between the second phoneme sequence and the standard phoneme sequence according to the comparison result of the DTW algorithm;
    obtaining the at least one error word from the input sentence and at least one standard word corresponding to the at least one error word from the learning sentence according to the error information; and
    generating the ancillary information comprising the at least one error word and the at least one standard word.

4. The language learning method according to claim 1, wherein the step of determining whether the input sentence is the same as the learning sentence displayed on the display comprises:
    comparing the input sentence with the learning sentence by using a DTW algorithm;
    obtaining an identity information between the input sentence and the learning sentence according to a comparison result of the DTW algorithm;
    aligning at least one correct word in the input sentence which is the same as the learning sentence with at least one standard word in the learning sentence which is corresponding to the at least one correct word according to the identity information; and when the input sentence is not completely aligned with the learning sentence, determining that the input sentence is different from the learning sentence.

5. The language learning method according to claim 1 further comprising:
displaying the learning sentence through the display; and
receiving the first input voice through the voice receiver.

6. A language learning device, comprising:
a first processor, transforming a first input voice into an input sentence according to a grammar rule, wherein the first processor obtains, based on the first input voice, a first phoneme sequence and then obtains, based on the entire first phoneme sequence, the input sentence according to the grammar rule, wherein the first phoneme sequence represents a pronunciation of the entire first input voice; and
a second processor, determining whether the input sentence is the same as a learning sentence, wherein the second processor obtains, based on the input sentence, a second phoneme sequence and determines whether the second phoneme sequence is the same as a standard phoneme sequence corresponding to the learning sentence, wherein the second phoneme sequence represents a pronunciation of the entire input sentence,
when the second phoneme sequence is different from the standard phoneme sequence, the second processor determines that the input sentence is different from the learning sentence,
wherein when the input sentence is different from the learning sentence, the second processor generates an ancillary information comprising at least one error word in the input sentence that is different from the learning sentence,
wherein the second processor divides the input sentence into at least one phrase according to a grammar format of the learning sentence and generates the ancillary information in unit of the at least one phrase, wherein the ancillary information comprises the at least one error word and at least one phoneme of a standard phoneme sequence corresponding to the learning sentence, wherein the at least one phoneme is pronounced incorrectly and corresponded to the at least one error word,
wherein the learning sentence comprises a plurality of words, and the second processor determines the standard phoneme sequence compliant with a grammatical structure of the learning sentence according to positions of the plurality of words in the learning sentence,
wherein the ancillary information further comprises a suggestion indicating to practice a pronunciation of at least two adjacent words of a specific phrase which conforms to a specific phrase structure recorded in a grammar database, wherein the at least two adjacent words comprises one of the at least one error word.

7. The language learning device according to claim 6, wherein the second processor compares the second phoneme sequence with the standard phoneme sequence by using a dynamic time warping (DTW) algorithm and determines whether the second phoneme sequence is the same as the standard phoneme sequence according to a comparison result of the DTW algorithm.

8. The language learning device according to claim 7, wherein when the second phoneme sequence is different from the standard phoneme sequence, the second processor obtains an error information between the second phoneme sequence and the standard phoneme sequence according to the comparison result of the DTW algorithm, obtains the at least one error word from the input sentence and at least one standard word corresponding to the at least one error word from the learning sentence according to the error information, and generates the ancillary information comprising the at least one error word and the at least one standard word.

9. The language learning device according to claim 6, wherein the second processor compares the input sentence with the learning sentence by using a DTW algorithm and obtains an identity information between the input sentence and the learning sentence according to a comparison result of the DTW algorithm,
wherein the second processor aligns at least one correct word in the input sentence which is the same as the learning sentence with at least one standard word in the learning sentence which is corresponding to the at least one correct word according to the identity information,
wherein when the input sentence is not completely aligned with the learning sentence, the second processor determines that the input sentence is different from the learning sentence.

10. The language learning device according to claim 6 further comprising a display and a voice receiver, wherein the display displays the learning sentence, and the voice receiver receives the first input voice.

11. A non-transitory computer readable recording medium, storing a plurality of program codes, wherein when the program codes are loaded into a processor, the processor executes the program codes to accomplish following steps:
transforming a first input voice from a voice receiver into an input sentence according to a grammar rule;
determining whether the input sentence is the same as a learning sentence displayed on a display; and
when the input sentence is different from the learning sentence, generating an ancillary information comprising at least one error word in the input sentence that is different from the learning sentence,
wherein the step of transforming the first input voice from the voice receiver into the input sentence according to the grammar rule comprises:
obtaining, based on the first input voice, a first phoneme sequence, wherein the first phoneme sequence represents a pronunciation of the entire first input voice; and
obtaining, based on the entire first phoneme sequence, the input sentence according to the grammar rule,
wherein the step of determining whether the input sentence is the same as the learning sentence displayed on the display comprises:
obtaining, based on the input sentence, a second phoneme sequence, wherein the second phoneme sequence represents a pronunciation of the entire input sentence;
determining whether the second phoneme sequence is the same as a standard phoneme sequence corresponding to the learning sentence; and
determining whether the input sentence is different from the learning sentence when the second phoneme sequence is different from the standard phoneme sequence,
wherein the step of generating the ancillary information comprising the at least one error word in the input sentence that is different from the learning sentence comprises:
dividing the input sentence into at least one phrase according to a grammar format of the learning sentence; and generating the ancillary information in unit of the at least one phrase, wherein the ancillary information comprises the at least one error word and at least one phoneme of a standard phoneme sequence corresponding to the learning sentence, wherein the at least one phoneme is pronounced incorrectly and corresponded to the at least one error word, wherein the learning sentence comprises a plurality of words, and the standard phoneme sequence compliant with a grammatical structure of the learning sentence is determined according to positions of the plurality of words in the learning sentence, wherein the ancillary information further comprises a suggestion indicating to practice a pronunciation of at least two adjacent words of a specific phrase which conforms to a specific phrase structure recorded in a grammar database, wherein the at least two adjacent words comprises one of the at least one error word.

12. The computer readable recording medium according to claim 11, wherein the step of determining whether the second phoneme sequence is the same as the standard phoneme sequence corresponding to the learning sentence comprises:

comparing the second phoneme sequence with the standard phoneme sequence by using a dynamic time warping (DTW) algorithm; and determining whether the second phoneme sequence is the same as the standard phoneme sequence according to a comparison result of the DTW algorithm.

13. The computer readable recording medium according to claim 12, wherein the step of generating the ancillary information comprising the at least one error word in the input sentence that is different from the learning sentence comprises:

obtaining an error information between the second phoneme sequence and the standard phoneme sequence according to the comparison result of the DTW algorithm;

obtaining the at least one error word from the input sentence and at least one standard word corresponding to the at least one error word from the learning sentence according to the error information; and generating the ancillary information comprising the at least one error word and the at least one standard word.

14. The computer readable recording medium according to claim 11, wherein the step of determining whether the input sentence is the same as the learning sentence displayed on the display comprises:

comparing the input sentence with the learning sentence by using a DTW algorithm;

obtaining an identity information between the input sentence and the learning sentence according to a comparison result of the DTW algorithm;

aligning at least one correct word in the input sentence which is the same as the learning sentence with at least one standard word in the learning sentence which is corresponding to the at least one correct word according to the identity information; and when the input sentence is not completely aligned with the learning sentence, determining that the input sentence is different from the learning sentence.

15. The computer readable recording medium according to claim 11 further comprising:

displaying the learning sentence through the display; and
receiving the first input voice through the voice receiver.

* * * * *